Aug. 19, 1958  
L. E. ELFES ET AL  
MOUNTING AND LIFTING MEANS FOR A TRACTOR MOUNTED CUTTING ASSEMBLY  
Filed Oct. 19, 1954

INVENTORS.
LEE E. ELFES &
LEO J. LORENZ
BY
Carlson, Pitzner, Hubbard & Wolfe
ATTORNEYS.

Aug. 19, 1958   L. E. ELFES ET AL   2,847,812
MOUNTING AND LIFTING MEANS FOR A TRACTOR
MOUNTED CUTTING ASSEMBLY
Filed Oct. 19, 1954   6 Sheets-Sheet 2

INVENTORS.
LEE E. ELFES &
LEO J. LORENZ
BY Carlson, Pitzner, Hubbard & Wolfe
ATTORNEYS.

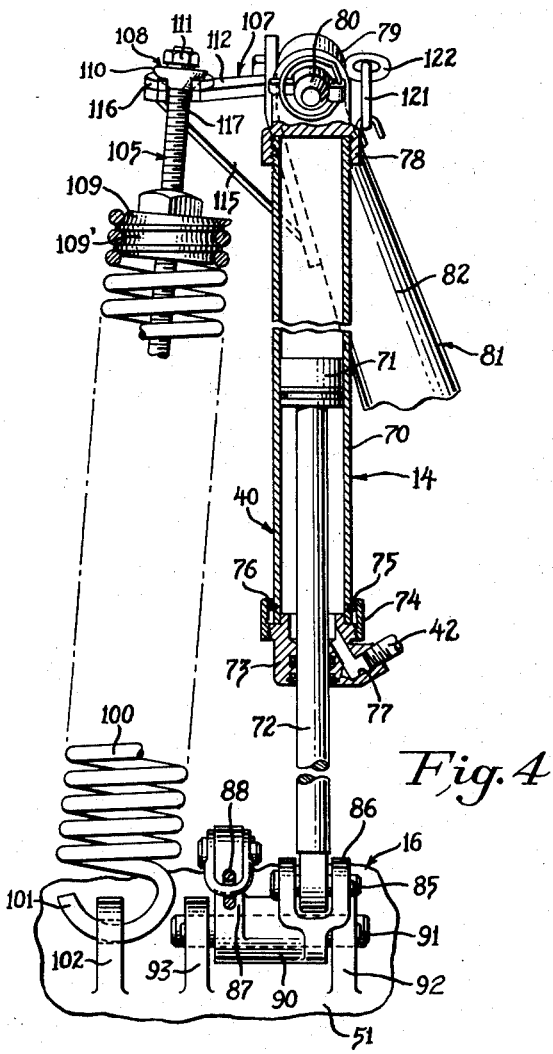

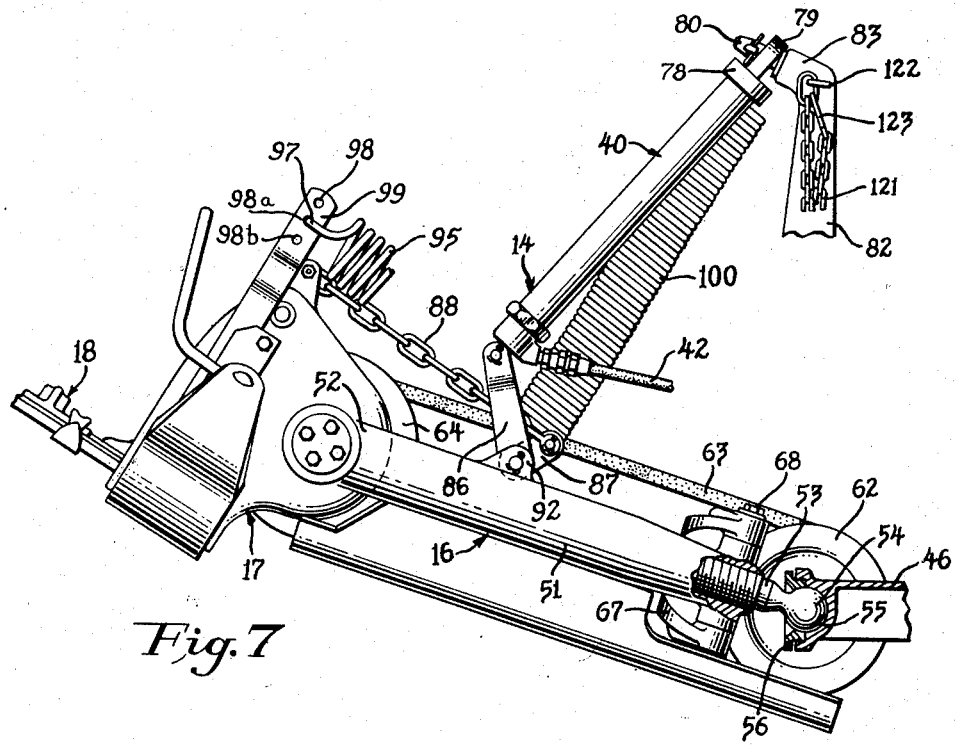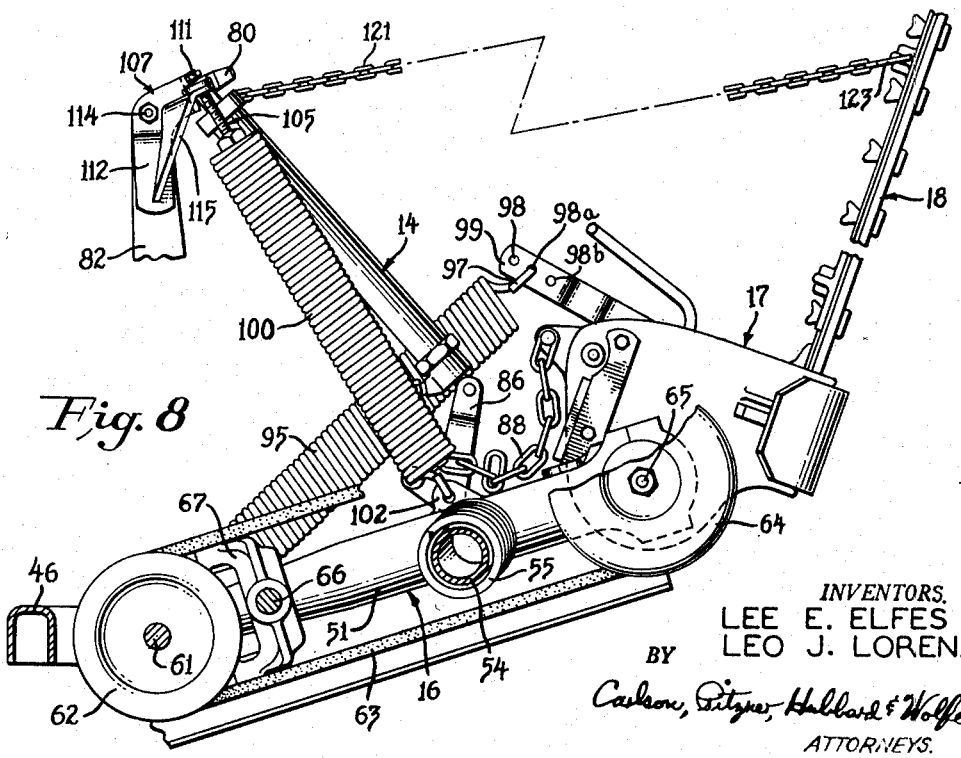

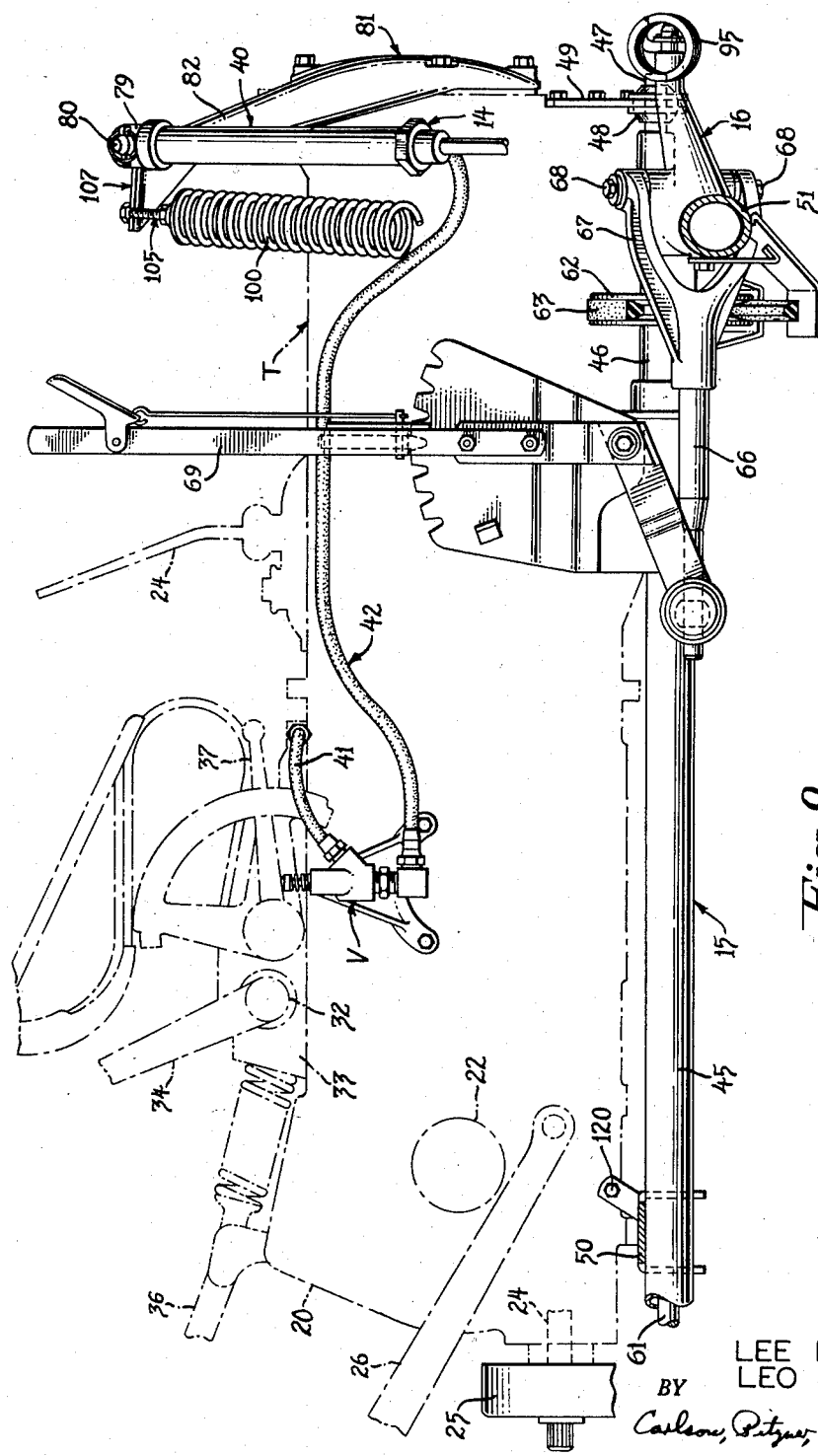

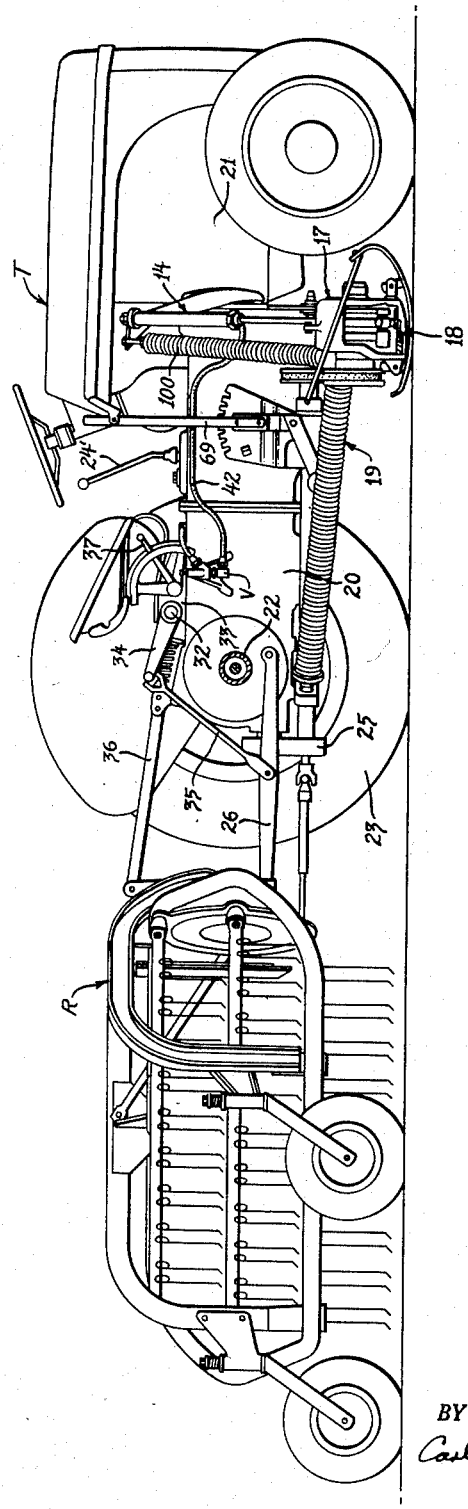

United States Patent Office 2,847,812
Patented Aug. 19, 1958

2,847,812

MOUNTING AND LIFTING MEANS FOR A TRACTOR MOUNTED CUTTING ASSEMBLY

Lee E. Elfes, Birmingham, and Leo J. Lorenz, Detroit, Mich., assignors to Massey-Ferguson Inc., Baltimore, Md., a corporation of Maryland Application October 19, 1954, Serial No. 463,136

9 Claims. (Cl. 56—25)

The invention relates to tractor mounted mowers and more particularly to mowers adapted for mounting at one side of the tractor.

One object of the invention is to provide in a mower of the above general character, improved mechanism for raising and lowering the cutter bar and its associated structure which is much simpler and less expensive to make than mechanisms hereto employed in such mowers, and yet sufficiently rugged and versatile to adapt it for general agricultural use.

Another object is to provide improved cutter bar positioning or control mechanism adapted for use with the basic structural units of what is commonly known as a heavy duty or highway type mower whereby to provide a mower sufficiently simple and inexpensive to be practicable for farm use.

It is also an object of the invention to provide a mower unit adapted to accommodate either heavy duty or light duty mechanism for raising and lowering the cutter bar.

A further object is to provide a side-mounted mower having operating mechanism powered from the tractor hydraulic system and constructed and arranged so that the mower may be operated with an implement coupled to the tractor's hitch linkage and permitting the implement to be operated alone, if desired.

Other objects and advantages of the invention will become apparent from the following detailed description of the preferred embodiment illustrated in the accompanying drawings, in which:

Fig. 4 is a fragmentary sectional view taken on a plane substantially on the line 4—4 of Fig. 2, showing details of the cutter bar positioning mechanism.

Fig. 4a is a circuit diagram showing the manner in which the control mechanism is interconnected with the tractor hydraulic system.

Fig. 5 is a fragmentary sectional view of the counterbalance spring anchoring structure on a somewhat enlarged scale.

Fig. 6 is a fragmentary top view of the actuator and counterbalance spring supporting structure taken in a plane substantially on the line 6—6 of Fig. 2.

Fig. 7 is a partially sectioned view similar to Fig. 2 showing the cutter bar supporting structure in a raised position.

Fig. 8 is a partially sectioned rear elevational view of the cutter bar supporting structure showing the supporting structure and the cutter bar in raised position.

Fig. 9 is a fragmentary longitudinal sectional view of the mower showing details of the frame structure by which it is supported on the tractor.

Fig. 10 is a side elevational view of a tractor mounting a mower constructed in accordance with the invention and carrying a side delivery rake on its trailing implement hitch linkage.

Figure 1:
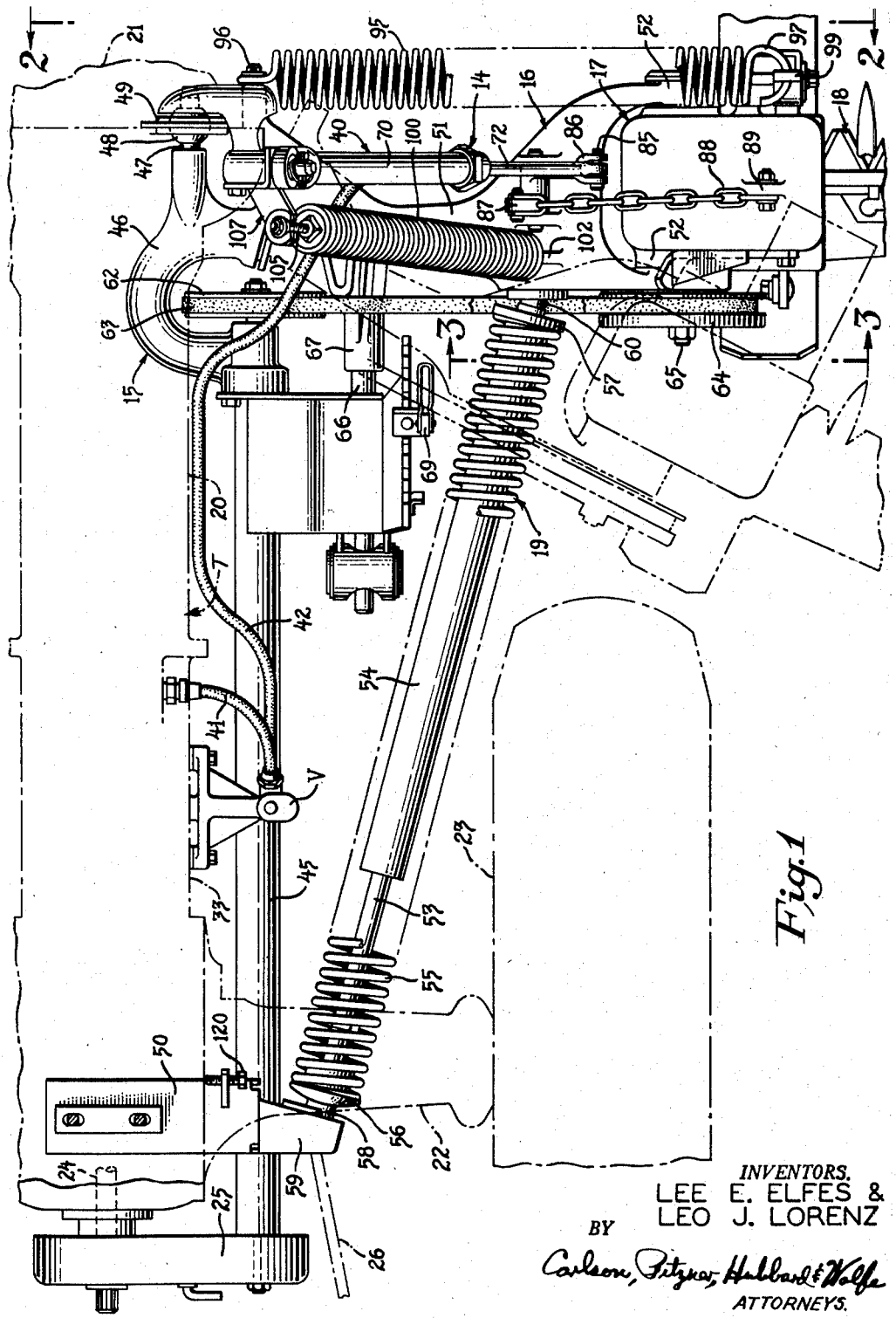
Figure 1 is a fragmentary plan view of a mower embodying the features of the invention, the mower being shown mounted on a tractor.

While the invention is susceptible of various modifications and alternative constructions, there is shown in the drawings, and will be described in detail, a preferred embodiment thereof. It is to be understood, however, that it is not thereby intended to limit the invention to the form illustrated, but the intention is to cover all modifications and alternative constructions falling within the spirit and scope of the invention as expressed in the appended claims.

By way of illustration the invention has been shown as embodied in a cutter bar positioning or control mechanism 14 designed for use with a mower made up of basic structural units of the type disclosed in our copending application, Serial No. 447,984, filed August 5, 1954, and assigned to the same assignee as the present application. The basic units include a frame structure 15 designed for convenient attachment to a tractor, a drag bar 16 supported at one end on said frame structure for universal pivotal movement and carrying at its outer end a cutter bar assembly comprising a drivehead 17 and an elongated cutter bar 18.

Drive mechanism is provided on the frame for driving the cutter bar 18 from the power take-off shaft of the tractor. The cutter bar is normally held in laterally projecting relation to the tractor by a spring-loaded mechanism 19 connected between the frame structure and the drag bar and adapted to permit the latter to swing rearwardly on its pivot or "break back" in case the cutter bar encounters an obstruction when the mower is moving forwardly. The positioning mechanism 14 which is interposed between the tractor and the drag bar 16 includes power actuated means for raising and lowering the drag bar and the cutter bar assembly to position the cutter bar in working position or in position for transport.

The particular mower illustrated is especially adapted for use with tractors equipped with a hydraulically operated implement hitch and a rear power take-off shaft, such as the "Ferguson" tractor. It has been illustrated as mounted on a tractor T of that type (Figs. 1 and 10) which has an elongated body 20 rigidly secured at its forward end to the tractor engine 21 by bolts inserted through mating flanges on the respective parts. Extending from opposite sides of the tractor housing adjacent its rear end are a pair of axle housings 22 supporting the tractor's rear drive wheels 23. The wheels are driven from the tractor engine in well known manner through a differential and a change-speed transmission enclosed in the tractor body, the transmission being selectively engaged by the usual manual shift lever 24' (Fig. 10).

Tractors of the type shown are equipped with a rear power take-off shaft 24 (Figs. 1 and 9) adapted to be driven from the tractor engine. This power take-off shaft projects at the rear of the tractor housing and is drivingly connected with the mower through suitable gearing or the like enclosed by a guard 25.

For attaching certain types of implements, such tractors are equipped with a hitch linkage including a pair of draft links 26 universally pivoted at their forward ends on the tractor housing below and somewhat forwardly of the rear axle. Hydraulic lift mechanism is provided in the tractor housing for raising and lowering the draft links. This mechanism, shown diagrammatically in Fig. 4a, includes a ram 27 comprising a cylinder 28 with a working piston 29 operatively connected by a piston rod 30 with a crank arm 31 fast on a rock shaft 32. The shaft, as shown, is journaled in a cover plate 33 closing the upper part of the tractor housing.

The ends of the shaft project outside the housing and carry crank arms 34 which are connected by drop links 35 with the draft links 26 as shown in Fig. 10. The hitch linkage also includes a top or control link 36 through which the operation of the tractor hydraulic system is controlled by the implement in well known manner to maintain a uniform working depth.

In so far as the present invention is concerned, the tractor hydraulic system simply provides a source of fluid under pressure for operating the cutter bar positioning mechanism 14. For present purposes it is sufficient to note that the system includes an engine-driven pump (not shown) adapted to deliver fluid under pressure to the ram 27 under control of valve means (not shown) operated jointly by a hand lever 37 (Fig. 9) called the quadrant lever, and draft responsive means actuated by force applied through the top link 36 of the hitch. The arrangement is such that upon delivery of pressure fluid to the ram cylinder 28, the shaft 32 is rocked in a direction to raise the hitch linkage and the implement attached thereto. When the cylinder 28 is vented, the piston 29 retreats into the cylinder and the linkage descends under the gravity load imposed on it by the attached implement.

Suitable porting is provided in the tractor body as, for example, in the cover plate 33 for establishing a connection with the tractor hydraulic system for supplying pressure fluid to the cutter bar positioning mechanism, that is, to a pressure fluid operated actuator 40 constituting a part of that mechanism (Figs. 1, 4a and 9). A flexible conduit 41 extends from the supply port in the tractor body to a control valve V which is connected by a flexible conduit 42 with the actuator 40. As will be seen by reference to Fig. 4a, the arrangement is such that the actuator may be connected to the fluid supply line of the tractor in parallel with the ram 27.

The valve V may be of any preferred type adapted to control delivery of pressure fluid to the actuator 40 and exhaust of fluid therefrom. By way of example, the valve may be similar to that disclosed in the patent to J. M. Chambers, Serial No. 2,592,393, issued April 8, 1952. When a valve of that type is employed, it is mounted on the tractor body in a position to be actuated by the quadrant lever 37 of the tractor when the lever is pushed down slightly from the position shown in Fig. 9. As is well understood in the art, the quadrant lever when swung upwardly from that position, causes fluid under pressure to be delivered through the line 38 to the ram 27. The pressure of the fluid is determined by the load imposed on the draft links by the implement attached thereto or, alternatively, the system may be loaded by providing stay bars for restraining the draft links against upward movement. In either case, fluid under pressure is directed by way of the conduit 41, valve V, and conduit 42 to the actuator 40 to raise the operating elements of the mower.

The lifting action of the actuator 40 may be stopped at any time by pushing the quadrant lever down sufficiently to interrupt the delivery of pressure fluid through the line 38. The valve V then acts to trap fluid in the actuator 40, thus preventing downward movement of the mower parts so that the cutter bar is held in any selected position for mowing or in a fully raised position for transport. Upon further depression of the quadrant lever a movable member or plunger forming a part of the valve V is engaged to open the valve and thereby vent the actuator 40 to the sump in the tractor. The mower parts consequently descend at a rate determined by the extent to which the valve has been opened.

As an aid to the understanding of the construction and mode of operation of the improved cutter bar positioning mechanism 14, the construction and relationship of the units which make up the exemplary mower will be described briefly. Referring to Figs. 1 and 9 of the drawings, the frame structure 15 in its preferred form comprises an elongated tubular member 45 rigidly joined at its forward end to the rear leg of a U-shaped frame member 46. The frame structure is secured to the tractor at two points spaced fore and aft of the tractor body. For this purpose the tractor is equipped with an implement attaching means engageable by a suitable connecting element on the forward end of the frame member 46. The connecting element, in this instance, comprises a forwardly projecting pin 47 while the attaching means includes a ball 48 apertured to receive the pin and seated in a socket formed in a bracket 49 attached to the tractor body, preferably at the junction of the body and the tractor engine. Adjacent its rear end the frame member 45 is welded or otherwise rigidly secured to a bracket 50 adapted to be bolted against a pad provided on the under side of the tractor body for attachment of a swinging draw bar.

As indicated heretofore, the drag bar 16 is supported on the frame structure for universal pivotal movement. The drag bar as herein shown (Figs. 1, 2 and 7) comprises an elongated tubular body 51 terminating at its outer end in a pair of laterally spaced arms 52 between which the drive head 17 is received, and to which it is pivotally secured to swing about an axis transverse to the longitudinal axis of the drag bar.

At its inner end the drag bar is fitted with a supporting element in the form of a pin 53 (Fig. 7) terminating in a ball-shaped head 54 engageable in a spherical socket 55 provided on the forward arm of the U-shaped frame member 46. A cap 56 threaded into the socket retains the parts in assembled relation. To provide for adjustment, the supporting member 53 may be screw-threaded into the end of the drag bar as shown in Fig. 7.

When the mower is in operation the drag bar 16 is held in a position such that the cutter bar 18 extends laterally of the tractor between the front and rear wheels substantially at right angles to the longitudinal axis of the tractor. The means for holding the assembly in such position is the "break back" mechanism 19. This mechanism, as shown in Fig. 1, includes a pair of telescopically assembled members 53 and 54, yieldably urged toward an extended position by a compression spring 55. The spring is interposed between a rear plug 56 fixed on the end of the inner member 53 and a front plug 57 fixed on the opposite end of the outer member 54. The plug 56 terminates in a ball element 58 adapted to seat in a socket formed in an extension 59 of the bracket 50. The plug 57 likewise terminates in a ball element 60 seating in a rearwardly opening socket provided in the drag bar 16.

In the above described mechanism, the members 53 and 54 cooperate to define the limit positions of the drag bar and cutter bar assembly. Thus they limit the forward swinging of the assembly to the working position in which the parts are shown in full lines in Fig. 1. If the cutter bar should meet an obstruction while the tractor is moving, that bar and the drag bar 16 are permitted to swing rearwardly as a unit or "break back" to the position shown in broken lines in Fig. 1, the spring 55 yielding to allow the members 53 and 54 to telescope together. This gives the driver ample time to stop the tractor before damage to the mower occurs.

Provision is made in the drive mechanism of the mower for automatically interrupting the drive for the cutter bar when a "break back" occurs. The drive mechanism shown is similar to that disclosed in our prior application above mentioned and includes a drive shaft 61 (Fig. 9) extending axially through and journaled in the frame member 45. Rearwardly of the frame member the shaft is drivingly connected with the tractor power take-off shaft 24. The forward end of the shaft 61 is extended into a U-shaped frame member 46 and has a pulley 62 keyed thereto. This pulley is drivingly connected by a V-belt 63 with a pulley 64 on a shaft 65 journaled in the drivehead 17 and constituting an input shaft for the head. The shaft 65 is mounted coaxially of the pivot for the head so that there is no interference with the drive when the head and cutter bar swing relative to the drag bar.

The shaft 61 is supported on the frame structure so that it is in axial alinement with the pivot of the drag bar 16. Accordingly, the drag bar may be raised or lowered without interfering with the drive. It will be observed, however, that the pulley 62 is spaced rearwardly with reference to the pivot of the drag bar. The relationship is such that when the drag bar is in operating position, the belt 63 is tensioned and thus conditioned for transmitting power from the shaft 61 to the shaft 65. When the cutter bar swings rearwardly or "breaks back," the belt 63 is slacked off and the drive for the cutter bar is thus interrupted.

The exemplary tractor is also provided with means for adjusting the fore-and-aft tilt of the drag bar and the cutter bar which it supports. This means, as shown in Fig. 9, includes a tilt lever 66 having at its forward end a yoke 67 straddling the drag bar and connected to it by pivot bolts 68 disposed transversely of the axis of the drag bar. Manually operable mechanism, including a hand lever 69 (Fig. 9) is provided for raising and lowering the rear end of the lever to rock the drag bar about its pivot on the frame structure and thus vary the position of the cutter bar with respect to a horizontal plane.

In accordance with the invention, the mechanism 14 is constructed and related to the other elements of the mower so that it can carry out its cutter bar positioning functions efficiently and dependably without interference from or interfering with the actions of the other elements above described. The mechanism is particularly characterized by its simple construction which enables it to be made cheaply and which materially simplifies the job of servicing it in the field. It is also characterized by the ease with which it may be mounted on and dismounted from a tractor. These are important considerations in the case of mowers designed for general farm use where servicing facilities are limited and where the tractor is frequently used with implements other than the mower.

As shown in Fig. 4, the power actuator for the positioning mechanism 14 comprises a cylinder 70 fitted with a working piston 71. In this instance the cylinder is anchored at its upper end to the tractor through the medium of implement attaching means provided on the tractor adjacent but spaced vertically from the attaching means securing the front end of the frame structure in place. The piston 71 is operatively connected with the drag bar and cutter bar assembly by means of a piston rod 72 extending through a cap 73 closing the lower end of the cylinder. As herein shown, the cap is secured in sealing relation to the cylinder by means of a sleeve 74 threaded on the cap and having an inturned flange 75 adapted to fit over the end of the cylinder wall and engaging a snap ring 76 seated in a groove in the wall. The cap is formed with a passage 77 opening at one side for connection with the conduit 42 through which pressure fluid is supplied to and exhausted from the cylinder as previously explained.

Figure 2:
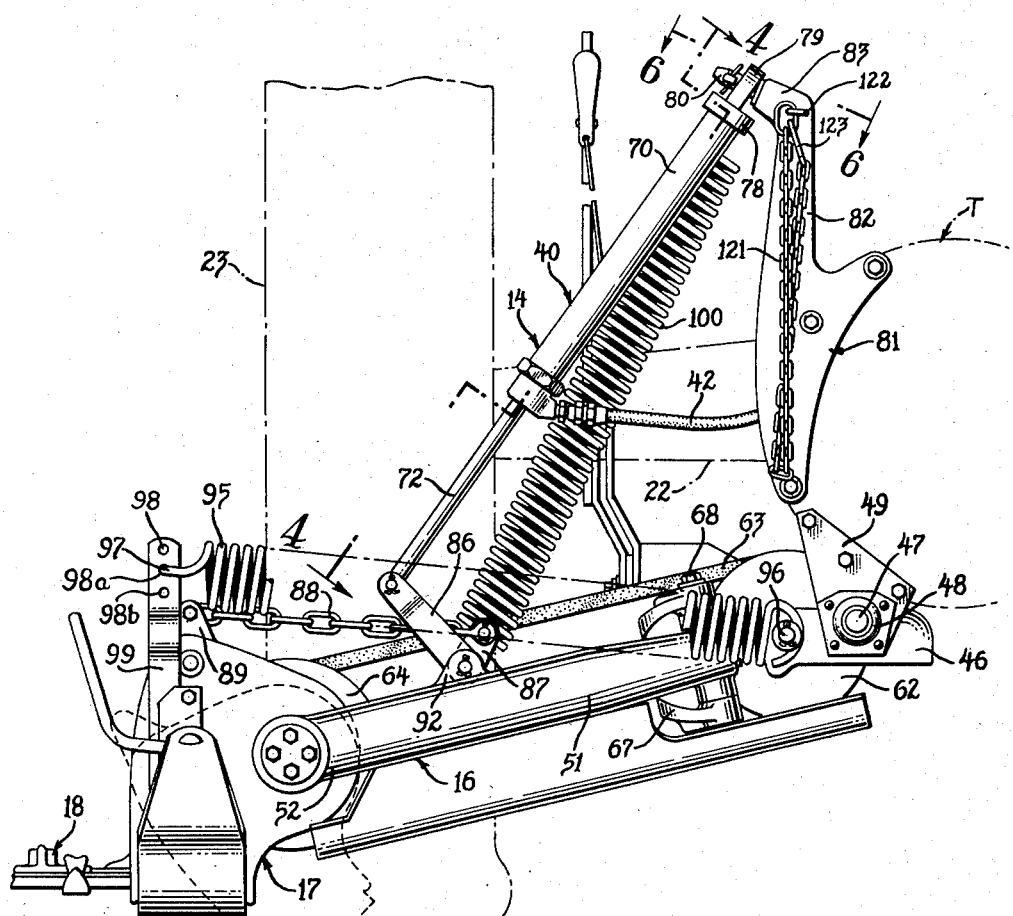
Fig. 2 is a front elevational view of the mower taken in a plane substantially on the line 2—2 of Fig. 1.
Figure 3:
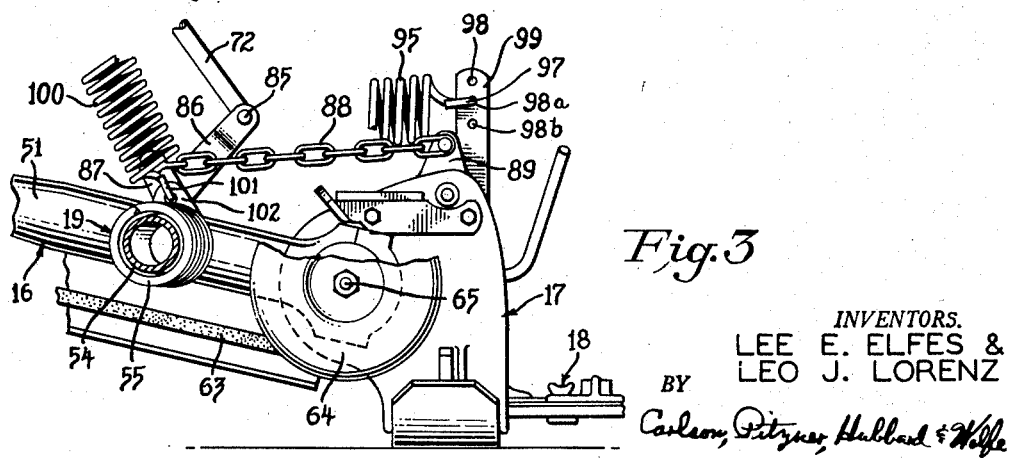
Fig. 3 is a fragmentary sectional view taken in a plane substantially on the line 3—3 of Fig. 1.

For anchoring the actuator to the tractor, the cylinder has its upper end threaded into a cup-shaped fitting 78 (Figs. 4 and 6) formed with an axially projecting lug 79 apertured to fit over a pin 80 carried by a bracket 81 secured to the tractor body and constituting the upper implement attaching means. As shown in Fig. 2, the bracket 81 has an arcuately formed portion apertured for reception of the bolts which secure the tractor body to the engine. An upstanding arm portion 82 of the bracket terminates in a socket portion 83 which holds the pin 80 in a generally upwardly and outwardly projecting position for convenient engagement by the apertured lug. Preferably, the pin 80 and coacting aperture are dimensioned to afford a relatively loose fit so that the actuator may swing transversely as well as radially of the pin to accommodate the various movements of the drag bar.

The operative connection of the piston rod 72 with the drag bar and cutter bar assembly is constructed and arranged to distribute the pull of the actuator so that the cutter bar 18 and the drag bar 16 may be swung upwardly substantially simultaneously on their respective pivots. To this end the piston rod is pivotally secured as by a pin 85 between the forked ends of one arm 86 of a bell crank lever pivotally mounted on the drag bar 16 intermediate its ends. The other arm 87 of the bell crank lever is connected by a flexible tension link, herein shown as a chain 88 with an upstanding lug 89 on the drivehead 17. The lever arm provided by the lug and the leverage ratio of the bell crank arms 86 and 87 may be conveniently correlated with respect to the unbalanced weight of the cutter bar and drag bar so that both are raised or swung upwardly on their pivots simultaneously when pressure fluid is admitted to the lower end of the cylinder 70.

In the particular embodiment illustrated, bell crank arms 86 and 87 are formed integrally with and extend radially from a central hub portion 90 apertured for the reception of a pivot pin 91. The hub portion 90 is dimensioned to fit between a pair of upstanding lugs 92 and 93 provided on the drag bar, the lugs being apertured to accommodate the pin as shown in Fig. 4. It may be noted that the lugs 92 and 93 also serve as connecting points for positioning and counterbalancing mechanism when the drag bar is employed as a unit of a heavy-duty mower. Thus, the same drag bar construction may be used interchangeably for different types of mowers.

Preferably a substantial portion of the weight of each of the pivoted elements of the mower is counterbalanced by suitable spring means. Thus, as shown in Figs. 1 and 2, the overhanging weight of the cutter bar 18 and drivehead 17 are counterbalanced by a coiled tension spring 95 having one end hooked over a pin 96 projecting laterally from the drag bar adjacent its inner pivoted end. At its other end, the spring has a hook element 97 engageable selectively in one of a series of apertures 98, 98a or 98b in a lever arm 99 rigidly attached to and extending upwardly along one side of the drivehead 17.

The apertures 98, 98a and 98b are spaced apart along the lever arm and thus located at different distances from the pivotal axis of the drivehead and cutter bar assembly. Accordingly, the counterbalance spring may be anchored to the lever arm at various selected positions to provide the correct force for counterbalancing cutter bars of different weights.

The weight of the drag bar 16 and the associated elements which it supports is counterbalanced by a coiled tension spring 100 anchored at its upper end to the tractor body and having at its lower end a hook 101 (Fig. 4) engageable in an apertured lug 102 rigid with the drag bar 16. As will be seen by reference to the drawings, the lug 102 is located substantially in fore-and-aft alinement with the lugs 92 and 93, and, like those lugs, serves to adapt the drag bar for universal application.

The means for anchoring the upper end of the counterbalance spring 100 to the tractor, in accordance with the invention, is constructed and arranged to facilitate the mounting of the mower on the tractor and to provide a simple, efficient means for adjusting the tension of the spring. For this purpose, the spring is provided at its upper end with a headed connecting element 105 (Figs. 4–6) adapted to seat in an annular socket 106 defined by a companion connecting element 107 mounted on the tractor. The socket 106 is formed with an opening at one side so that the element 105 may be engaged therein or disengaged therefrom by a simple lateral movement of one element relative to the other.

In the preferred form shown in the drawings, the connecting element 105 comprises an elongated rod having a head 108 integral with or rigidly attached to its upper end. The rod is threaded throughout its length for engagement through a threaded aperture in a plug 109 adapted to be secured to the spring 100 in any suitable manner. As shown in Fig. 4, the plug is formed with a helical groove 109' dimensioned to threadedly engage the coils adjacent the end of the spring and thus restrain the plug against axial movement relative to the spring.

The head 108 is formed to present a downwardly facing bearing surface 110 complemental to the bearing surface to the socket 106, the surface preferably being generally spherical. This permits the spring and attached connecting element to swing freely in any direction and thus accommodate the various movements of the drag bar. The head 108 is also formed with a square or hexagonal wrench-engaging portion 111 by which the element 105 may be turned to screw it into or out of the plug 109 for regulating the effective length of the spring assembly and thus determining the tension of the spring when connected between the drag bar and the socket 106.

The connecting element 107 as shown is in the form of an auxiliary bracket comprising a tongue portion 112 with an upstanding, generally L-shaped flange at one end shaped to fit closely against the socket 83 and adjacent the arm 82 of the actuator mounting on the bracket 81. Thus, the flange includes a section 112' adapted to extend along one side of the socket and the arm and a section 113 bent over at right angles to the first section and apertured to fit over the pin 80 carried by the socket. The element may be secured in place as by means of of a screw 114 threaded into the side of the socket. As shown in Figs. 4 and 8, one edge of the tongue 112 is bent down to form a triangular gusset 115 which serves to reinforce the tongue 112 and prevent it from bending under the load imposed on it by the spring 100.

The socket 106 as shown in Fig. 5, is formed in a pad 116 welded or otherwise suitably attached to the upper face of the tongue 112. To permit engagement and disengagement of the connecting element as above described, the pad 116 and adjacent portion of the tongue 112 are formed to present a slot 117 opening laterally from socket 106. This slot is dimensioned to permit free passage of the element 105 but is substantially narrower than the diameter of the socket so that the head 108 is securely retained in the socket by the tension of the spring 100.

The features of construction above described in conjunction with the unitary character of the improved mower makes it possible for one man to attach the mower to a tractor or to detach it in a very short time and without requiring any heavy lifting. Thus, the actuator 40 is dimensioned so that when the mower is laid out flat on the ground alongside the tractor, it may be extended so that the lug 79 can be hooked over the pin 80 carried by the tractor. After this connection is made, the valve V is mounted on the cover plate of the tractor to establish connection with the tractor hydraulic system. With the tractor engine running, the quadrant lever is then manipulated to cause the tractor to deliver pressure fluid by way of the conduit 41 and 42 to the lower end of the actuator cylinder 70. This forces the piston 71 upwardly and lifts the forward end of the mower so that the front supporting pin 47 may be easily inserted in the ball 48.

While the actuator 40 supports the major portion of the mower weight, the rear end of the mower can be lifted easily and secured to the tractor by bolting the bracket 50 in place. Before the bracket bolts are tightened, the drive connection with the power take-off shaft 24 is installed. The mower frame may then be shifted laterally to tighten up the drive and then locked in place by a suitable stop screw 120 provided on the bracket 50.

The final operation is the attachment of the counterbalance spring 100 to the tractor. To effect that connection, it is necessary only to supply pressure fluid to the actuator 40 to lift the drag bar and cutter bar assembly substantially to transport position. The spring connecting element 105 can then be slipped through the slot 117 to seat the head 108 in the socket 106. The mower is then ready for operation.

The mower may be detached from the tractor with equal ease by a reversal of the operating steps above described. It will be evident therefore that both attachment and detachment of the mower are simple, easy tasks requiring no heavy lifting and taking relatively little time.

If desired, the improved mower may be operated simultaneously with another implement, such, for example, as a side-delivery rake R coupled to the tractor draft links, as shown in Fig. 10. The actuator 40 is so proportioned with respect to the main ram 27 that the actuator acts to raise the mower before the ram lifts the rake. After the mower has been raised to its upper limit position, the ram can operate in the usual manner to raise the rake to transport position. If it is desired to operate the rake alone, the mower is secured in raised or transport position by means of a chain 121 (Fig. 2) secured at one end to the bracket arm 82 as by an eye-bolt 122 and having a hook 123 at the other end engageable with the cutter bar 18. When the chain is not in use the hook is engaged in the eye-bolt as shown.

It will be apparent from the foregoing that the invention provides power operated, cutter bar positioning mechanism of novel and advantageous construction, particularly well adapted for agricultural mowers, designed for use with tractors. The low cost of the mechanism makes it economically practical for farm use and its simple construction, ruggedness, ease of attachment and detachment and absence of specialized service requirements essentially recommends it for such use.

We claim as our invention:

1. In a mower having a frame mountable at one side of a tractor, a drag bar supported at one end on said frame for universal pivoting movement, a cutter bar drivehead supported at the other end of said drag bar to pivot about an axis, transverse to the longitudinal axis of the bar, a cutter bar rigid with and projecting laterally from said drivehead, power operated means for raising and lowering said drag bar and said cutter bar comprising a bell crank lever having arms of uneven length fulcrumed on said drag bar to pivot about an axis substantially parallel to the pivotal axis of said drivehead, an upstanding lug on said drivehead, a flexible tension link connected between said lug and the shorter arm of said bell crank lever, and a pressure fluid operated actuator connected between the longer arm of said bell crank lever and the tractor upon which the mower frame is mounted, said actuator being operative when supplied with pressure fluid to exert a tension force on said bell crank lever, the arms of said bell crank lever being proportioned so that the drag bar and the drivehead cutter bar assembly are swung simultaneously upon their pivots upon operation of said actuator.

2. In a mower having a frame mountable at one side of a tractor, a drag bar supported at one end on said frame for universal pivoting movement, a cutter bar drivehead supported at the other end of said drag bar to pivot about an axis transverse to the longitudinal axis of the bar, a cutter bar rigid with and projecting laterally from said drivehead, power operated means for raising and lowering said drag bar and said cutter bar comprising a bell crank lever having two arms of unequal length fulcrumed on said drag bar to pivot about an axis substantially parallel to the pivotal axis of said drivehead, an upstanding lug on said drivehead, a flexible tension link connected between said lug and the shorter arm of said bell crank lever, a pressure fluid operated actuator including a cylinder supported at one end on the tractor, a piston in said cylinder operatively connected with the longer arm of said bell crank lever, and means on the tractor for supplying fluid under pressure to said cylinder to actuate said piston and rock said bell crank in a direction to swing the cutter bar and drivehead assembly and the drag bar upwardly about their respective pivots.

3. In a mower having a frame mountable at one side of a tractor, a drag bar supported at one end on said frame for universal pivoting movement, a cutter bar drivehead supported at the other end of said drag bar to pivot about an axis transverse to the longitudinal axis of the bar, a cutter bar rigid with and projecting laterally from said drivehead, power operated means for raising and lowering said drag bar and said cutter bar comprising a bell crank lever having two arms of unequal length fulcrumed on said drag bar to pivot about an axis substantially parallel to the pivotal axis of said drivehead, an upstanding lug on said drivehead, a flexible tension link connected between said lug and the shorter arm of said bell crank lever, a pressure fluid operated actuator including a cylinder and piston respectively anchored to the tractor and to the longer arm of said bell crank lever, a pressure fluid supply system carried on and powered by the tractor for supplying pressure fluid to said actuator to swing the drivehead and cutter bar assembly and the drag bar upwardly about their respective pivots, and spring means connected between the tractor and said drag bar for relieving said actuator of a portion of the load imposed on it by the weight of the drag bar and the cutter bar and drivehead assembly.

4. In a mower having a frame mountable at one side of a tractor, a drag bar supported at one end on said frame for universal pivoting movement, a cutter bar drivehead supported at the other end of said drag bar to pivot about an axis, transverse to the longitudinal axis of the bar, a cutter bar rigid with and projecting laterally from said drivehead, power operated means for raising and lowering said drag bear and said cutter bar comprising a bell crank lever having two arms of unequal length fulcrumed on said drag bar to pivot about an axis substantially parallel to the pivotal axis of said drivehead, an upstanding lug on said drivehead, a flexible tension link connected between said lug and the shorter arm of said bell crank lever, a pressure fluid operated actuator including a cylinder and piston respectively anchored to the tractor and to the longer arm of said bell crank lever, a pressure fluid supply system carried on and powered by the tractor for supplying pressure fluid to said actuator to swing the drivehead and cutter bar assembly and the drag bar upwardly about their respective pivots, a tension spring connected between the tractor and the drag bar for counterbalancing the weight of the drag bar and the cutter bar drivehead assembly, a lever arm fixed to said drivehead and extending generally upwardly therefrom, and another tension spring connected between said frame structure and said lever arm for counterbalancing the overhanging weight of the cutter bar.

5. In a mower having a frame mountable at one side of a tractor, a drag bar supported at one end on said frame for universal pivoting movement, a cutter bar drivehead supported at the other end of said drag bar to pivot about an axis transverse to the longitudinal axis of the bar, a cutter bar rigid with and projecting laterally from said drivehead, spring loaded means acting between the tractor and said drag bar for yieldably holding the bar in laterally projecting relation to the tractor, power operated means for raising and lowering said drag bar and said cutter bar comprising a bell crank lever having two arms of unequal length fulcrumed on said drag bar to pivot about an axis substantially parallel to the pivotal axis of said drivehead, an upstanding lug on said drivehead, a flexible tension link connected between said lug and the shorter arm of said bell crank lever, a pressure fluid operated actuator connected to the tractor and to the longer arm of said bell crank lever operative to swing the drag bar and the cutter bar and drivehead assembly upwardly about their respective pivots, said actuator having universal pivotal connection with the tractor to accommodate the rearward swinging of the drag bar against the force exerted by said spring loaded means when the cutter bar encounters an obstruction.

6. In a mower having a frame structure mountable at one side of a tractor, a cutter bar, a drive head for said cutter bar, an elongated drag bar pivotally supported at one end on said frame structure, said drag bar terminating at its other end in spaced arms pivotally supporting said cutter bar drivehead, a plurality of integral upstanding lugs on said drag bar and spaced inwardly of said arms, a bell crank lever having two arms of unequal length pivotally supported between a pair of said lugs, a pressure fluid operated actuator connected between the tractor and the longer arm of said bell crank lever for rocking the lever, a flexible tension link connecting the shorter arm of said lever with said drivehead, and a counterbalance spring connected between the tractor and another of said lugs on the drag bar.

7. The combination with a mower having a frame mountable at one side of a tractor, a drag bar pivoted on and extending laterally from said frame, a pressure fluid operated actuator including a cylinder having an apertured mounting lug at one end and a working piston with a piston rod extending from the other end, means pivotally connecting said piston rod with the drag bar, a counterbalance spring connected at one end to said drag bar and having at its other end a headed connecting element, implement attaching means mountable on the tractor including a rigid arm extending generally upwardly and outwardly at one side of the tractor, a pin adjacent the end of said arm adapted to engage in said apertured lug to anchor said cylinder to the tractor, and a bracket projecting at one side of said arm defining a socket for receiving said headed connecting element to anchor said spring to the tractor, said socket having an opening at one side providing a passageway for said element.

8. The combination with a mower having a frame mountable at one side of a tractor, a drag bar pivoted on and extending laterally from said frame, a pressure fluid operated actuator including a cylinder having an apertured mounting lug at one end and a working piston with a piston rod extending from the other end, means pivotally connecting said piston rod with the drag bar, a counterbalance spring connected at one end to said drag bar and having at its other end a headed connecting element, implement attaching means mountable on the tractor including a rigid arm extending generally upwardly and outwardly at one side of the tractor, a pin adjacent the end of said arm adapted to engage in said apertured lug to anchor said cylinder to the tractor, and a bracket projecting at one side of said arm defining a socket for receiving said headed connecting element to anchor said spring to the tractor, said connecting element having a screw threaded connection with said spring for adjustment axially thereof to vary the tension of the spring.

9. In a mower having a frame structure mountable at one side of a tractor, a cutter bar, a drive head for said cutter bar, an elongated drag bar pivotally supported at one end on said frame structure, said drag bar terminating at its other end in spaced arms pivotally supporting said cutter bar drive head, a plurality of integral upstanding lugs on said drag bar spaced inwardly of said arms, a bell crank lever having two arms of unequal length pivotally supported between a pair of said lugs, a pressure fluid operated actuator connected between the tractor and the longer arm of said bell crank lever for rocking the lever, a flexible tension link connecting the shorter arm of said lever with said drive head, and a counterbalance spring connected between the tractor and another of said lugs on the drag bar, said pair of lugs being spaced from the cutter head so as to permit said actuator to raise and lower said one end of the drag bar and said frame between ground level and its mounting position on the tractor while the drive head and cutter bar are resting on the ground.

References Cited in the file of this patent

UNITED STATES PATENTS

| | | |
|---|---|---|
| 1,758,527 | Maine | May 13, 1930 |
| 1,778,862 | Maine | Oct. 21, 1930 |
| 1,822,204 | Coultas | Sept. 8, 1931 |
| 2,236,598 | Hautzerroeder | Apr. 1, 1941 |
| 2,291,987 | Rodgers | Aug. 4, 1942 |
| 2,329,881 | Clapper | Sept. 21, 1943 |
| 2,590,537 | Holmes | Mar. 25, 1952 |
| 2,617,242 | Iverson | Nov. 11, 1952 |